US012629668B2

(12) United States Patent
Park

(10) Patent No.: US 12,629,668 B2
(45) Date of Patent: May 19, 2026

(54) METHOD OF REMANUFACTURING SPENT CATALYST FOR HEAVY OIL DESULFURIZATION

(71) Applicant: Hanseo University Academic Cooperation Foundation, Seosan-si (KR)

(72) Inventor: Hea Kyung Park, Seoul (KR)

(73) Assignee: Hanseo University Academic Cooperation Foundation, Seosan-si (KR)

( * ) Notice: Subject to any disclaimer, the term of this patent is extended or adjusted under 35 U.S.C. 154(b) by 480 days.

(21) Appl. No.: 18/452,382

(22) Filed: Aug. 18, 2023

(65) Prior Publication Data

US 2024/0342698 A1 Oct. 17, 2024

(30) Foreign Application Priority Data

Apr. 12, 2023 (KR) ........................ 10-2023-0048228

(51) Int. Cl.
| | |
|---|---|
| *B01J 35/40* | (2024.01) |
| *B01J 35/61* | (2024.01) |
| *B01J 37/04* | (2006.01) |
| *B01J 37/08* | (2006.01) |
| *B01J 38/02* | (2006.01) |
| *B01J 38/62* | (2006.01) |

(52) U.S. Cl.
CPC .............. *B01J 35/40* (2024.01); *B01J 35/61* (2024.01); *B01J 37/04* (2013.01); *B01J 37/08* (2013.01); *B01J 37/088* (2013.01); *B01J 38/02* (2013.01); *B01J 38/62* (2013.01)

(58) Field of Classification Search
CPC ... B01J 35/40; B01J 35/61; B01J 37/04; B01J 37/08; B01J 37/088; B01J 38/02; B01J 38/62; B01J 23/005; B01J 23/88; B01J 23/882; B01J 23/883; B01J 23/888; B01J 23/92; B01J 23/94
USPC ........... 502/56, 313–315, 321, 524; 208/213, 208/216 R, 217
See application file for complete search history.

(56) References Cited

U.S. PATENT DOCUMENTS

| | | | | |
|---|---|---|---|---|
| 6,406,615 | B1 * | 6/2002 | Iwamoto .............. | C10G 49/002 |
| | | | | 208/213 |
| 2003/0019794 | A1 * | 1/2003 | Schmidt ................... | B01J 25/02 |
| | | | | 208/244 |
| 2004/0040890 | A1 * | 3/2004 | Morton .................. | B01J 23/888 |
| | | | | 502/313 |
| 2013/0178663 | A1 * | 7/2013 | Zhou .................... | B01J 23/8993 |
| | | | | 502/313 |
| 2014/0076781 | A1 * | 3/2014 | Park ......................... | B01J 38/06 |
| | | | | 502/28 |
| 2018/0178209 | A1 * | 6/2018 | Park ...................... | C10G 47/16 |
| 2022/0023850 | A1 * | 1/2022 | Kim ........................ | B01J 38/52 |
| 2022/0062873 | A1 | 3/2022 | Devers et al. | |

FOREIGN PATENT DOCUMENTS

| | | | | | |
|---|---|---|---|---|---|
| CN | 109647436 A | * | 4/2019 | ............. | B01J 38/10 |
| JP | 2012148215 A | * | 8/2012 | ............. | B01J 29/90 |
| KR | 101434437 B1 | * | 8/2014 | ............. | B01J 38/72 |
| KR | 20180075059 A | | 7/2018 | | |
| KR | 20200078389 A | | 7/2020 | | |
| WO | WO199961557 A1 | | 12/1999 | | |

* cited by examiner

*Primary Examiner* — Patricia L. Hailey
(74) *Attorney, Agent, or Firm* — STIP Law Group, LLC

(57) ABSTRACT

Proposed is a method of remanufacturing a spent catalyst for heavy oil desulfurization. More particularly, proposed is a method of remanufacturing a spent catalyst for heavy oil desulfurization, in which the spent catalyst can be used as a substitute for a fresh catalyst, have economic feasibility, and reduce the environmental burden by reusing a spent catalyst that is to be discarded or buried.

11 Claims, No Drawings

METHOD OF REMANUFACTURING SPENT CATALYST FOR HEAVY OIL DESULFURIZATION

CROSS REFERENCE TO RELATED APPLICATION

The present application claims priority to Korean Patent Application No. 10-2023-0048228, filed on Apr. 12, 2023, the entire contents of which is incorporated herein for all purposes by this reference.

BACKGROUND OF THE DISCLOSURE

1. Field of the Disclosure

The present disclosure relates to a method of remanufacturing a spent catalyst for heavy oil desulfurization. More particularly, the present disclosure relates to a method of remanufacturing a spent catalyst for heavy oil desulfurization, in which the spent catalyst that is to be discarded or buried due to reduced catalytic activity is used as a substitute for a fresh catalyst through a series of processes for reuse.

2. Description of the Related Art

A catalyst for heavy oil desulfurization, used in a hydrodesulfurization process of heavy oil or residual oil, is used to reduce viscosity and improve combustibility and reactivity in a fluid catalytic cracking process by removing impurities, such as sulfur and heavy metals (mostly vanadium) contained in the heavy oil.

Petroleum, currently the largest energy source for humankind, is refined through various processes for use. Although demand for light oil is increasing, crude oil itself tends to become heavier. Accordingly, not only Korea but also developed countries have made a great deal of investment in advanced refining facilities, referred to as secondary oil fields in Korea. However, new investment is currently depressed because the crude oil refining industry is shrinking due to eco-friendly and decarbonization trends. Nevertheless, the reality is that upgrading facilities are essential to reduce dependence on high-quality crude oil and ensure profitability with low-quality crude oil.

As the running time of the desulfurization process elapses under conditions of high temperatures and high pressures, sulfur and heavy metals, such as vanadium, contained in the heavy oil and coke components generated during the process are gradually deposited on the catalyst. Due to the deposition, the entrance of the catalyst micropores impregnated with active ingredients is completely blocked. Accordingly, the heavy oil and the active ingredients are blocked from being in contact with each other, leading to a point where the reaction can no longer occur. As a result, the catalyst reaches the end of its life. In addition, the replacement cycle is considerably short, approximately less than one year.

The spent catalyst that has reached the end of its life as a catalyst is crushed to collect only valuable metals, or buried when being economically infeasible. This may cause a problem of contaminating groundwater or the like as designated waste due to the elution of heavy metals contained in the spent catalyst. Therefore, it is urgent to propose a method for reusing the spent catalyst for the heavy oil desulfurization process.

Hence, various regeneration methods of spent catalysts for heavy oil desulfurization have been proposed. For example, in International Patent Publication No. WO1999/

061557, proposed is a regeneration method of a spent catalyst through processes of washing the catalyst with a solvent and then removing carbonized material by performing heat treatment at a temperature in a range of 200° C. to 800° C. In addition, disclosed is a method of performing a desulfurization process by allowing heavy oil to pass through a reactor filled with regenerated the catalysts through the regeneration method.

However, such heat treatment removes only the deposited carbonized material and sulfur components through oxidation, so the deposited vanadium components are not removed and keep blocking the entrance of catalyst the micropores. Accordingly, the desulfurization performance may be temporarily restored. Still, there is a problem in that the desulfurization performance is unlikely to be continuously maintained for a long time corresponding to the original life of a fresh catalyst.

Hence, in Korean Patent No. 10-1434437, proposed is a method of regenerating a spent catalyst by washing the spent catalyst with a solvent, performing heat treatment at a temperature in a range of 400° C. to 550° C. to remove sulfur and carbonized material, and then removing vanadium using a solvent.

The catalyst regenerated through such a regeneration method has the advantage that the deposited vanadium component is completely leached and removed. However, a significant amount of active ingredients, molybdenum and nickel, are also lost at the same time. As a result, a sufficient level of catalytic activity as a catalyst fails to be exhibited. In addition, since the catalyst is regenerated in a solution or slurry phase, separate processes of leaching, washing, and drying are necessary, and thus the costs increase. As a result, there is a limitation in that economic feasibility fails to be practically ensured by catalyst regeneration.

DOCUMENT OF RELATED ART

Patent Document (Patent Document 001) International Patent Publication No. WO1999/061557 (published on Dec. 2, 1999)

(Patent Document 0002) Korean Patent No. 10-1434437 (published on Aug. 27, 2014)

SUMMARY OF THE INVENTION

The present disclosure has been made to solve the above problems, and the main objective of the present disclosure is to provide a method of remanufacturing a spent catalyst for heavy oil desulfurization. The regeneration method not only can minimize the loss of catalytically active ingredients without involving leaching, washing, and drying processes but also can economically manufacture a catalyst having desulfurization performance and specific surface area that are equivalent to those of a fresh catalyst.

In order to accomplish the above objective, an embodiment of the present disclosure provides a method of remanufacturing a spent catalyst for heavy oil desulfurization. The remanufacturing method includes: (a) performing heat treatment on a spent catalyst for heavy oil desulfurization, (b) performing dry mixing by adding a spinel-structured metal oxide represented by Formula 1, a solid polycarboxylic acid, and a catalytically active material precursor to the spent catalyst obtained through the heat treatment, and (c) performing calcination of the resulting mixture obtained by the dry mixing.

$$XAl_2O_4 \hspace{3cm} [\text{Formula 1}]$$

In Formula 1, X is Ni, Cu, or Zn.

In a preferred embodiment of the present disclosure, in the (a) performing, the heat treatment may be performed at a temperature in a range of 250° C. to 350° C.

In a preferred embodiment of the present disclosure, in the (b) performing, the spinel-structured metal oxide represented by Formula 1 and/or the solid polycarboxylic acid may be added to perform a first dry mixing, and then the catalytically active material precursor may be added to perform a second dry mixing.

In a preferred embodiment of the present disclosure, in the (b) performing, 0.1 to 5 parts by weight of the spinel-structured metal oxide represented by Formula 1, 0.5 to 15 parts by weight of the solid polycarboxylic acid, and 0.5 to 15 parts by weight of the catalytically active material precursor may be added, with respect to 100 parts by weight of the spent catalyst obtained through the heat treatment.

In a preferred embodiment of the present disclosure, in the (b) performing, the dry mixing may be performed by mechanical mixing.

In a preferred embodiment of the present disclosure, the mechanical mixing may be performed by milling at a rotation speed in a range of 100 rpm to 300 rpm in an inert atmosphere.

In a preferred embodiment of the present disclosure, the solid polycarboxylic acid may be at least one selected from the group consisting of malonic acid, succinic acid, glutaric acid, adipic acid, pimelic acid, terephthalic acid, isophthalic acid, homophthalic acid, and phenyl glutaric acid.

In a preferred embodiment of the present disclosure, the catalytically active material precursor may include at least one selected from the group consisting of: at least one metal selected from the group consisting of molybdenum, tungsten, cobalt, and nickel; oxides of the at least one metal selected from the group; and mixtures of both.

In a preferred embodiment of the present disclosure, in the (c) performing, the calcination may be performed at a temperature in a range of 450° C. to 600° C.

In a preferred embodiment of the present disclosure, a regenerated catalyst remanufactured thereby may have a desulfurization performance of 97% or higher with respect to that of a fresh catalyst.

In a preferred embodiment of the present disclosure, a regenerated catalyst remanufactured thereby may have a specific surface area of 97% or higher with respect to that of a fresh catalyst.

According to the present disclosure, when performing mechanical dry mixing by adding a spinel-structured metal oxide, a polycarboxylic acid, and a catalytically active material to a spent catalyst for heavy oil desulfurization obtained through heat treatment performed at low temperatures, the loss of catalytically active ingredients can be minimized, without involving leaching, washing, and drying processes. In addition, a specific surface area can be maintained at a level equivalent to that of a fresh catalyst, so a catalytic activity equivalent to that of the fresh catalyst can be obtained in a hydrotreating process of heavy oil or residue oil, especially in a desulfurization process. Furthermore, the remanufactured catalyst of the present disclosure can exhibit a better catalytic activity than catalysts regenerated through existing regeneration processes and thus can be perfectly usable as an alternative catalyst for the fresh catalyst.

4

DESCRIPTION OF THE PREFERRED EMBODIMENTS

Advantages and features of the present disclosure, and methods for achieving them will become clear with reference to the embodiments described below in detail in conjunction with the accompanying drawings. However, the present disclosure is not limited to the embodiments set forth below and will be implemented in many different forms. The following embodiments are provided only to completely disclose the disclosure and inform those skilled in the art of the scope of the present disclosure. In addition, the present disclosure is defined only by the scope of the appended claims.

The term "heavy oil" or "residual oil" mentioned herein regarding petroleum products refers to oil including distillation residues, such as atmospheric residual oil, vacuum residual oil, and the like, but does not include oil composed only of split oil, such as kerosene, diesel oil, vacuum gas oil, and the like.

As the terms regarding a catalyst, "fresh catalyst", "spent catalyst", and "regenerated catalyst" are used herein, and the definitions thereof are as follows.

First, the term "fresh catalyst" mentioned herein means a catalyst manufactured for use in a desulfurization process of heavy oil or residual oil. The fresh catalyst includes catalysts that have never been used in the desulfurization process as well as catalysts that were once used for the desulfurization process but stopped for use in a short time due to equipment problems and used again as they were. In other words, the fresh catalyst includes catalysts that still have a sufficient hydrotreating activity considered from the outset, even when being temporarily used or without involving a specific activation process.

The term "spent catalyst" mentioned herein means a catalyst that has been used in the desulfurization process of heavy oil or residual oil, and is no longer capable of obtaining sufficient desulfurization activity.

The term "regenerated catalyst" mentioned herein means an activated catalyst obtained by removing impurities from the spent catalyst according to the remanufacturing process of the present disclosure.

The spent catalyst, the fresh catalyst, and the regenerated catalyst mentioned herein are supported catalysts having a form in which catalytically active materials and a carrier supporting the same are contained.

The catalytically active materials, which are components substantially exhibiting catalytic activity, may include a transition metal. For example, the catalytically active materials may include at least one selected from the group consisting of: at least one metal selected from the group consisting of molybdenum, tungsten, cobalt, and nickel; oxides of the at least one metal selected from the group; and mixtures of both.

On the other hand, the carrier, used for supporting the catalytically active materials, functions to support and disperse the catalyst to increase the surface areas thereof, stabilize the catalyst, and reduce the cost of the catalyst. The carrier itself has no activity but affects the catalytic activity due to the functions described above. In addition, even with the same composition, there may be a significant difference in catalytic activity depending on the amounts of supported active ingredients. Therefore, the selection of the carrier also needs to be taken into account.

In the present disclosure, any material capable of being applied to a carrier of the catalyst for a desulfurization process may be used as the carrier. For example, at least one selected from the group consisting of activated carbon, zeolite, $Al_2O_3$, $SiO_2$, and $ZrO_2$ is available. Specifically, $Al_2O_3$ may be used.

The amounts of the catalytically active materials being lost may be minimized after the completion of the remanufacturing process. As a result, the regenerated catalyst, according to the present disclosure, may have a specific surface area that is restored to a level equivalent to that of the fresh catalyst and exhibit desulfurization performance so as to be practically applied to the desulfurization process. Such effects are to be achieved by the remanufacturing method described below.

In the present disclosure, provided is a method of remanufacturing a spent catalyst for heavy oil desulfurization, which includes: (a) performing heat treatment on a spent catalyst for heavy oil desulfurization, (b) performing dry mixing by adding a spinel-structured metal oxide represented by Formula 1, a solid polycarboxylic acid, and a catalytically active material precursor to the spent catalyst obtained through the heat treatment, and (c) performing calcination of the resulting mixture obtained by the dry mixing.

$$XAl_2O_4 \qquad \text{[Formula 1]}$$

In Formula 1, X may be Ni, Cu, or Zn.

In the method of remanufacturing the spent catalyst for heavy oil desulfurization according to the present disclosure, heat treatment is first performed on a spent catalyst for heavy oil desulfurization [(a)].

In an existing process of regenerating a spent catalyst for heavy oil desulfurization, the heat treatment is performed at a high temperature of 400° C. or higher to remove carbon and sulfur deposited on the spent catalyst, and then heavy metals, such as vanadium, are removed. In such a process, high-temperature heat treatment is first performed when the deposition amount of vanadium is large, so the vanadium component acts as an oxidation catalyst. In other words, sulfur dioxide generated during the oxidation of metal present in the form of a sulfur compound is oxidized, thereby facilitating sulfur trioxide to be produced. In addition, $Al_2(SO_4)_3$ is formed by the reaction between $Al_2O_3$, serving as a carrier, and sulfuric acid generated by the reaction between sulfur trioxide and moisture, so the mechanical strength of the catalyst is likely to be deteriorated. In addition, reaction heat generated by the exothermic reaction fails to be released to the outside of the catalyst micropores and thus is trapped inside the micropores. Accordingly, a rapid local temperature rise makes temperature control difficult. Furthermore, there may be problems in that active ingredients, molybdenum and nickel, aggregate to each other, thereby reducing the specific surface area, and the loss of active sites deteriorates the desulfurization performance.

Hence, in the present disclosure, carbon and sulfur deposited in the spent catalyst may be removed by low-temperature heat treatment to avoid problems caused when performing heat treatment at high temperatures in a state where the deposition amount of vanadium is large.

The low-temperature heat treatment may be performed at a temperature in a range of 250° C. to 350° C., preferably in the range of 280° C. to 320° C., for 2 hours to 5 hours, and more preferably in the range of 290° C. to 310° C. for 2 hours to 4 hours. When the temperature and time of the heat treatment fall within the above numerical ranges, the carbon and sulfur deposited in the spent catalyst, used for preventing condensation of the active ingredients and exhibiting a catalytic activity equivalent to that of the fresh catalyst, may be removed.

On the other hand, removing heavy oil or residual oil remained in the spent catalyst using a solvent may be further performed before performing the low-temperature heat treatment described above. The solvent used for the removing is not particularly limited in the present disclosure, and any solvent capable of easily dissolving a known petroleum product may be used. For example, the solvent may be at least one selected from the group consisting of: aliphatic hydrocarbons, such as pentane, hexane, heptane, and isooctane; alicyclic hydrocarbons, such as cyclohexane; aromatic hydrocarbons, such as benzene, toluene, xylene, and styrene; naphtha; kerosene; and a mixed solvent thereof. Preferably, kerosene or heptane corresponding to an aliphatic hydrocarbon that is not highly volatile and is inexpensive may be used.

The removing of the heavy oil or residual oil is not particularly limited in temperature and may be performed one or more times under conditions of room temperature and normal pressure. Preferably, the removing may be performed three or more times with temperature application to sufficiently remove the heavy oil or residual oil. Depending on the devices, methods such as immersion and spraying may be used, and a batch or continuous process may be performed.

Drying for removing the residual solvent may be performed after removing the heavy oil or residual oil. Then, the dried spent catalyst may be subjected to the low-temperature heat treatment. In this case, the temperature and time of the drying are not particularly limited and may vary depending on the types of solvent. For example, the drying may be performed at a temperature in a range of 60° C. to 180° C. for 1 hour to 24 hours.

Next, dry mixing is performed by adding a spinel-structured metal oxide, a solid polycarboxylic acid, and a catalytically active material precursor to the spent catalyst for heavy oil desulfurization obtained through the heat treatment [(b)].

The term "spinel structure" used herein typically means a structure having a form in which metals, X and Y, are present in a cubic crystal form of $XY_2O$, oxygen anions are arranged in a cubic close-packed lattice, and the cation metals, X and Y, occupy some or all of the octahedral and tetrahedral sites in the lattice.

In the present disclosure, the spinel-structured metal oxide, especially applicable to the remanufacturing of the spent catalyst for heavy oil desulfurization, may be at least one of $NiAl_2O_4$, $ZnAl_2O_4$, and $CuAl_2O_4$ that satisfy Formula 1, which is an aluminum-based spinel structure having a large surface area as well as excellent mechanical strength, acid resistance, and heat resistance. Preferably, the metal oxide is $NiAl_2O_4$.

A currently available product or a product obtained by manufacturing the same may be used as the spinel-structured metal oxide. In this case, any manufacturing method known in the art may be used without limitation.

The spinel-structured metal oxide may have an average particle size in a range of 100 nm to 1,000 nm, preferably in the range of 500 nm to 1,000 nm. When the average particle size of the spinel-structured metal falls within the above numerical range, the surface area may be large enough to control heat generation easily during the reaction.

The spinel-structured metal oxide may be added in an amount in a range of 0.1 to 5.0 parts by weight and preferably in the range of 0.5 to 3.0 parts by weight, with respect to 100 parts by weight of the spent catalyst for heavy oil desulfurization obtained through the heat treatment. When the amount of the spinel-structured metal oxide is less than 0.1 parts by weight, there may be a concern that the effect of improving the mechanical strength and durability of the spent catalyst is marginal. On the contrary, when the amount of the spinel-structured metal oxide exceeds 5.0 parts by weight, there may be a concern that the additional effect is insignificant and thus become economically ineffective.

In the present disclosure, while being added to the spent catalyst for heavy oil desulfurization obtained through the heat treatment and then dry-mixed, the spinel-structured metal oxide satisfying Formula 1 may form a matrix in the carrier of the spent catalyst to restore catalytic performance and significantly improve mechanical strength and durability when being shaped into a form, such as pellets and honeycombs.

On the other hand, when being mixed with the spent catalyst, the solid polycarboxylic acid may cause a coordination bond to be formed between a carboxyl group and metal ions contained in the spent catalyst, and then be combine with the catalytically active material precursor being newly added and mixed, thereby re-dispersing metals aggregated in the spent catalyst, especially, metals such as vanadium.

The solid polycarboxylic acid may include an aliphatic dicarboxylic acid having 3 to 20 carbon atoms and an aromatic dicarboxylic acid having 8 to 40 carbon atoms. Specifically, the aliphatic dicarboxylic acid having 3 to 20 carbon atoms may be malonic acid, succinic acid, glutaric acid, adipic acid, pimelic acid, or a mixture thereof. In addition, the aromatic dicarboxylic acid having 8 to 40 carbon atoms may be terephthalic acid, isophthalic acid, homophthalic acid, phenyl glutaric acid, or a mixture thereof. From the viewpoint of catalytic activity, malonic acid or glutaric acid is preferably used as the dicarboxylic acid.

In this case, the solid polycarboxylic acid may be added in an amount in a range of 0.5 to 15 parts by weight and preferably in the range of 1 to 10 parts by weight, with respect to 100 parts by weight of the spent catalyst for heavy oil desulfurization obtained through the heat treatment. When the amount of the solid polycarboxylic acid is less than 0.5 parts by weight, the surface modification effect on the spent catalyst may be poorly exhibited, resulting in difficulty when performing a regeneration process of the spent catalyst. On the contrary, when the amount of the solid polycarboxylic acid exceeds 15 parts by weight, the polycarboxylic acid that fails to combine with the surface of the spent catalyst may remain around the catalyst due to the excessively added amount of the solid polycarboxylic acid. In this case, as the polycarboxylic acid binds itself outside the catalyst while interrupting the formation of a coordination bond on the surface of the spent catalyst, the effect of restoring the activity of the spent catalyst may be interrupted.

In addition, as long as the catalytically active material precursor is some sort of precursor capable of manufacturing a catalyst for heavy oil desulfurization by reacting with the polycarboxylic acid, any precursor may be used without limitation, regardless of the type thereof. Specifically, the catalytically active material precursor may include at least one selected from the group consisting of: at least one metal selected from the group consisting of molybdenum, tungsten, cobalt, and nickel; oxides of the at least one metal selected from the group; and mixtures of both. The catalytically active material precursor may be present in at least one form selected from the group consisting of an oxide, a nitride, a sulfide, a chloride, and the like, but is not limited thereto.

The catalytically active material precursor may be added in an amount in a range of 0.5 to 15 parts by weight and preferably in the range of 1 to 10 parts by weight, with respect to 100 parts by weight of the spent catalyst for heavy oil desulfurization obtained through the heat treatment. When the amount of the catalytically active material precursor is less than 0.5 parts by weight, the surface modification effect on the spent catalyst may be poorly exhibited, resulting in difficulty when performing the regeneration process of the spent catalyst. On the contrary, when the amount of the catalytically active material precursor exceeds 15 parts by weight, the catalytically active materials that fail to combine with the surface of the spent catalyst may remain around the catalyst due to the excessively added amount of the catalytically active material precursor. In this case, as the catalytically active material precursor binds itself outside the catalyst while interrupting the formation of a coordination bond on the surface of the spent catalyst, the effect of restoring the activity of the spent catalyst may be interrupted.

In addition, a molar ratio of the polycarboxylic acid to the catalytically active material precursor may be in a range of 1:0.5 to 1:1.5, specifically in the range of 1:0.7 to 1:1.5 or 1:0.9 to 1:1.1, and preferably is 1:1. When the molar ratio does not fall within the above numerical range, the surface modification of the spent catalyst may be deteriorated, and the resulting regeneration effect thus may be reduced. Therefore, the polycarboxylic acid and the catalytically active material precursor are necessary to be used in a proper relative ratio so as to obtain the maximum number of coordination bonds on the surface of the spent catalyst.

When the spinel-structured metal oxide, the polycarboxylic acid, and the catalytically active material precursor are added to the spent catalyst for heavy oil desulfurization obtained through the heat treatment, as described above, the dry mixing is performed.

In this case, all the spent catalyst for heavy oil desulfurization obtained through the heat treatment, spinel-structured metal oxide, polycarboxylic acid, and catalytically active material precursor are solid and may be present in all known solid phases, such as powder and crystal. Thus, the mixing of the spent catalyst for heavy oil desulfurization obtained through the heat treatment, the spinel-structured metal oxide, the polycarboxylic acid, and the catalytically active material precursor is performed by a dry mixing that does not involve a separate solvent.

When being mixed in a liquid or slurry phase as in existing methods, the characteristics of the catalyst may change after remanufacturing due to the solvent. In addition, additional washing and drying processes are necessary, which may cause secondary contamination. As a result, a spent catalyst is unlikely to be conveniently remanufactured in an environmentally friendly and economically effective manner.

In the dry mixing, the spent catalyst for heavy oil desulfurization obtained through the heat treatment, the spinel-structured metal oxide of Formula 1, the solid polycarboxylic acid, and the catalytically active materials may be simultaneously added and then dry-mixed. Alternatively, each of the components may be sequentially added and then dry-mixed. However, in terms of uniform dispersion and mixing of the catalytically active materials, the spinel-structured metal oxide of Formula 1 and/or the solid polycarboxylic acid is first dry-mixed with the spent catalyst for heavy oil desulfurization. Then, the catalytically active materials are preferably added thereto and dry-mixed.

In addition, the dry mixing of the spent catalyst for heavy oil desulfurization obtained through the heat treatment, the spinel-structured metal oxide, the solid polycarboxylic acid, and the catalytically active material precursor may be performed by mechanical mixing.

The mechanical mixing aims to form a uniform mixture by mixing the materials to be mixed by applying mechanical force. For example, a mixing machine, such as a ball mill using chemically inert beads, a planetary mill, a stirred ball mill, a vibrating mill, and the like, may be used to perform the mechanical mixing.

The mechanical mixing may be performed by milling for 30 minutes to 2 hours at a rotation speed in a range of 100 rpm to 300 rpm under an inert atmosphere to prevent the reduction of the catalyst while increasing the uniform mixing effect.

When the proximity of the heavy oil desulfurization spent catalyst heat-treated through milling, the spinel-structured metal oxide, the solid polycarboxylic acid, and the catalytically active material precursor increases, the uniformity and density of the catalyst increase.

When the rotation speed and time of the milling fall within the above numerical ranges, it is possible to control the particle sizes and proximity between particles of the spent catalyst for heavy oil desulfurization obtained through the heat treatment, the spinel-structured metal oxide, the solid polycarboxylic acid, and the catalytically active material precursor, without aggregation. As a result, the spinel-structured metal oxide, the solid polycarboxylic acid, and the catalytically active material precursor may be dispersed and mixed uniformly in the spent catalyst for heavy oil desulfurization obtained through the heat treatment.

Then, calcination of the resulting mixture obtained by the dry-mixing is performed to remanufacture the spent catalyst for heavy oil desulfurization [(c)].

The calcination, a process for completely removing carbon and sulfur contained in the spent catalyst, is performed at a temperature in a range of 450° C. to 600° C., preferably in the range of 500° C. to 550° C., for 1 hour to 3 hours. When the temperature and time of the calcination fall below the above numerical ranges, carbon and sulfur may fail to be effectively removed. On the contrary, when the temperature and time of the calcination exceed the above numerical ranges, there may be a concern that the catalytically active materials condense to each other and thus are lost. For this reason, appropriate temperature and time falling within the above numerical ranges are preferably applied.

The regenerated catalyst, remanufactured by the above-described method according to the present disclosure, is manufactured by mechanically dry-mixing the spinel-structured metal oxide, the polycarboxylic acid, and the catalytically active materials in the spent catalyst for heavy oil desulfurization obtained through the low-temperature heat treatment. Therefore, the loss of catalytically active ingredients can be minimized, without involving leaching, washing, and drying processes, and the specific surface area can be maintained at a level equivalent to that of the fresh catalyst. Hence, the regenerated catalyst of the present disclosure can have a catalytic activity equivalent to that of the fresh catalyst in a hydrotreating process of heavy oil or residue oil, especially in the desulfurization process. In addition, the regenerated catalyst of the present disclosure can exhibit better catalytic activity than catalysts regenerated through existing regeneration processes and thus can be perfectly usable as an alternative catalyst for the fresh catalyst.

The regenerated catalyst, according to the present disclosure, may have a desulfurization performance of 97% or higher with respect to that of the fresh catalyst. In addition, the specific surface area may also be restored to 978 or higher with respect to that of the fresh catalyst for reuse.

As a result, the regenerated catalyst, manufactured through the regeneration process according to the present disclosure, can reduce the environmental burden by reusing the spent catalyst that is to be discarded or buried.

Hereinafter, the present disclosure will be described in more detail through examples. These examples are intended to illustrate the present disclosure only, so the scope of the present disclosure is not to be construed as being limited by these examples.

Example 1

A heavy oil desulfurization process was performed at a domestic oil company. Next, the released spent catalyst was washed three times with kerosene to remove heavy oil from the spent catalyst, dried at room temperature for 10 hours, and then dried at 100° C. for 2 hours. The dried spent catalyst was subjected to heat treatment at a low temperature of 300° C. for 2 hours. Then, 1 part by weight of $NiAl_2O_4$ (having an average particle size of 600 nm) and 5 parts by weight of glutaric acid were added, with respect to 100 parts by weight of the spent catalyst obtained through the heat treatment. Next, ball milling (at a rotation speed of 200 rpm) was performed for 20 minutes in an Ar atmosphere. Afterward, 5 parts by weight of molybdenum trioxide ($MoO_3$) was added to the resulting mixture, with respect to 100 parts by weight of the spent catalyst obtained through the heat treatment, and ball milling (at a rotation speed of 200 rpm) was performed for 20 minutes in an Ar atmosphere to obtain a mixture. Then, the obtained mixture was subjected to calcination at 550° C. for 2 hours to manufacture a regenerated catalyst.

Example 2

A regenerated catalyst was manufactured in the same manner as in Example 1. However, in Example 2, $NiAl_2O_4$ was first added to the spent catalyst obtained through the heat treatment, and ball milling (at a rotation speed of 200 rpm) was performed for 20 minutes in an Ar atmosphere. Next, glutaric acid and molybdenum trioxide ($MoO_3$) were added to the resulting mixture, and ball milling (at a rotation speed of 200 rpm) was performed for 20 minutes in an Ar atmosphere for mixing. Then, the obtained mixture was subjected to calcination at 550° C. for 2 hours to manufacture the regenerated catalyst.

Example 3

A regenerated catalyst was manufactured in the same manner as in Example 1. However, in Example 3, glutaric acid was first added to the spent catalyst obtained through the heat treatment, and ball milling (at a rotation speed of 200 rpm) was performed for 20 minutes in an Ar atmosphere. Next, $NiAl_2O_4$ and molybdenum trioxide ($MoO_3$) were added to the resulting mixture, and ball milling (at a rotation speed of 200 rpm) was performed for 20 minutes in an Ar atmosphere for mixing. Then, the obtained mixture was subjected to calcination at 550° C. for 2 hours to manufacture the regenerated catalyst.

Example 4

A regenerated catalyst was manufactured in the same manner as in Example 1. However, in Example 4, molybdenum trioxide ($MoO_3$) was first added to the spent catalyst obtained through the heat treatment, and ball milling (at a rotation speed of 200 rpm) was performed for 20 minutes in an Ar atmosphere. Next, $NiAl_2O_4$ and glutaric acid were added to the resulting mixture, and ball milling (at a rotation speed of 200 rpm) was performed for 20 minutes in an Ar atmosphere for mixing. Then, the obtained mixture was subjected to calcination at 550° C. for 2 hours to manufacture the regenerated catalyst.

Example 5

A regenerated catalyst was manufactured in the same manner as in Example 1. However, in Example 5, glutaric acid, $NiAl_2O_4$, and molybdenum trioxide ($MoO_3$) were added separately to the spent catalyst obtained through the heat treatment, and ball milling (at a rotation speed of 200 rpm) was performed for 40 minutes in an Ar atmosphere for mixing. Then, the obtained mixture was subjected to calcination at 550° C. for 2 hours to manufacture the regenerated catalyst.

Example 6

A regenerated catalyst was manufactured in the same manner as in Example 1. However, in Example 6, $NiAl_2O_4$ and molybdenum trioxide ($MoO_3$) were first added to the spent catalyst obtained through the heat treatment, and ball milling (at a rotation speed of 200 rpm) was performed for 20 minutes in an Ar atmosphere. Next, glutaric acid was added to the resulting mixture, and ball milling (at a rotation speed of 200 rpm) was performed for 20 minutes in an Ar atmosphere for mixing. Then, the obtained mixture was subjected to calcination at 550° C. for 2 hours to manufacture the regenerated catalyst.

Example 7

A regenerated catalyst was manufactured in the same manner as in Example 1. However, in Example 7, glutaric acid and molybdenum trioxide ($MoO_3$) were first added to the spent catalyst obtained through the heat treatment, and ball milling (at a rotation speed of 200 rpm) was performed for 20 minutes in an Ar atmosphere. Next, $NiAl_2O_4$ was added to the resulting mixture, and ball milling (at a rotation speed of 200 rpm) was performed for 20 minutes in an Ar atmosphere for mixing. Then, the obtained mixture was subjected to calcination at 550° C. for 2 hours to manufacture the regenerated catalyst.

Example 8

A regenerated catalyst was manufactured in the same manner as in Example 1, except that $CuAl_2O_4$ was mixed instead of $NiAl_2O_4$ to manufacture the regenerated catalyst.

Example 9

A regenerated catalyst was manufactured in the same manner as in Example 1, except that $ZnAl_2O_4$ was mixed instead of $NiAl_2O_4$ to manufacture the regenerated catalyst.

Comparative Example 1

A regenerated catalyst was manufactured in the same manner as in Example 1. However, in Comparative Example 1, only molybdenum trioxide ($MoO_3$) was added to the spent catalyst obtained through the heat treatment, and ball milling (at a rotation speed of 200 rpm) was performed for 40 minutes in an Ar atmosphere for mixing. Then, the obtained mixture was subjected to calcination at 550° C. for 2 hours to manufacture the regenerated catalyst.

Comparative Example 2

A regenerated catalyst was manufactured in the same manner as in Example 1. However, in Comparative Example 2, only glutaric acid and molybdenum trioxide ($MoO_3$) were added to the spent catalyst obtained through the heat treatment, and ball milling (at a rotation speed of 200 rpm) was performed for 40 minutes in an Ar atmosphere for mixing. Then, the obtained mixture was subjected to calcination at 550° C. for 2 hours to manufacture the regenerated catalyst.

Comparative Example 3

A regenerated catalyst was manufactured in the same manner as in Example 1. However, in Comparative Example 3, only molybdenum trioxide ($MoO_3$) and $NiAl_2O_4$ were added to the spent catalyst obtained through the heat treatment, and ball milling (at a rotation speed of 200 rpm) was performed for 40 minutes in an Ar atmosphere for mixing. Then, the obtained mixture was subjected to calcination at 550° C. for 2 hours to manufacture the regenerated catalyst.

Comparative Example 4

A regenerated catalyst was manufactured in the same manner as in Example 1, except that simple stirring was performed for 40 minutes, without involving ball milling.

Comparative Example 5

A regenerated catalyst was manufactured in the same manner as in Example 1, except that the heat treatment was performed at 370° C.

Comparative Example 6

A regenerated catalyst was manufactured in the same manner as in Example 1, without involving the calcination.

Comparative Example 7

A regenerated catalyst was manufactured in the same manner as in Example 1, except that $MgAl_2O_4$ was used as the metal oxide.

TABLE 1

| Classification | Heat treatment temperature (° C.) | Metal oxide (A) Type | Amount (part by weight) | Polycarboxylic acid (B) Type | Amount (part by weight) | Catalytically active material precursor (C) Type | Amount (part by weight) | Dry mixing (i) | (ii) |
|---|---|---|---|---|---|---|---|---|---|
| Example 1 | 300 | $NiAl_2O_4$ | 1 | Glutaric acid | 5 | $MoO_3$ | 5 | A + B | C |
| Example 2 | 300 | $NiAl_2O_4$ | 1 | Glutaric acid | 5 | $MoO_3$ | 5 | A | B + C |
| Example 3 | 300 | $NiAl_2O_4$ | 1 | Glutaric acid | 5 | $MoO_3$ | 5 | B | A + C |
| Example 4 | 300 | $NiAl_2O_4$ | 1 | Glutaric acid | 5 | $MoO_3$ | 5 | C | A + B |
| Example 5 | 300 | $NiAl_2O_4$ | 1 | Glutaric acid | 5 | $MoO_3$ | 5 | A + B + C | — |
| Example 6 | 300 | $NiAl_2O_4$ | 1 | Glutaric acid | 5 | $MoO_3$ | 5 | A + C | B |
| Example 7 | 300 | $NiAl_2O_4$ | 1 | Glutaric acid | 5 | $MoO_3$ | 5 | B + C | A |
| Example 8 | 300 | $CuAl_2O_4$ | 1 | Glutaric acid | 5 | $MoO_3$ | 5 | A + B | C |
| Example 9 | 300 | $ZnAl_2O_4$ | 1 | Glutaric acid | 5 | $MoO_3$ | 5 | A + B | C |
| Comparative Example 1 | 300 | — | — | — | — | $MoO_3$ | 5 | C | — |
| Comparative Example 2 | 300 | — | — | Glutaric acid | 5 | $MoO_3$ | 5 | B + C | — |
| Comparative Example 3 | 300 | $NiAl_2O_4$ | 1 | — | — | $MoO_3$ | 5 | A + C | — |
| Comparative Example 4 | 300 | $NiAl_2O_4$ | 1 | Glutaric acid | 5 | $MoO_3$ | 5 | — | — |
| Comparative Example 5 | 370 | $NiAl_2O_4$ | 1 | Glutaric acid | 5 | $MoO_3$ | 5 | A + B | C |
| Comparative Example 6 | 300 | $NiAl_2O_4$ | 1 | Glutaric acid | 5 | $MoO_3$ | 5 | A + B | C |
| Comparative Example 7 | 300 | $MgAl_2O_4$ | 1 | Glutaric acid | 5 | $MoO_3$ | 5 | A + B | C |

Experimental Example

The characteristics of the regenerated catalysts, manufactured in Examples 1 to 9 and Comparative Examples 1 to 7, were measured by the following methods. The results thereof are shown in Table 2 below.

(1) Measurement of specific surface area: A specific surface area analyzer (ASAP 2020 purchased from Micromeritics Co.) was used. The measurement was performed by putting 0.5 g of each powder sample in a test tube, and then performing a pretreatment at 180° C. for 4 hours under an $N_2$ atmosphere to remove moisture and other impurities remaining in the catalyst sample.

(2) Measurement of desulfurization performance: The measurement was performed using CATATEST UNIT, a fixed-bed high-pressure continuous flow reactor. 0.5 g of a pre-sulfurized catalyst (having a particle size in a range of 80 to 100 mesh) was mounted on the center of the reactor. Then, hydrodesulfurization was performed while injecting 0.5 mol % dibenzothiophene (DBT)/n-heptane raw material solution under the following conditions [reactor operating conditions: temperature (673 K), pressure (30×10$^5$ Pa), contact time (0.02 $g_{cat}$·hr/ml feed), and $H_2$/H.C. molar ratio (40/1)].

The product obtained after desulfurization was analyzed by GC (6890A purchased from Hewlett Packard Co.), and the DBT conversion rate was calculated based on Equation 1 below for measuring desulfurization performance.

$$DBT \text{ conversion rate } (\%) = \quad \text{[Equation 1]}$$
$$(DBT \text{ content in reactants} - DBT \text{ content in product})/$$
$$DBT \text{ content in reactants} \times 100$$

TABLE 2

| Classification | Specific surface area compared to that of fresh catalyst (%) | DBT conversion rate compared to that of fresh catalyst (%) |
|---|---|---|
| Example 1 | 98 | 98.7 |
| Example 2 | 98 | 98.3 |
| Example 3 | 97 | 97.5 |
| Example 4 | 93 | 93.4 |
| Example 5 | 94 | 92.8 |
| Example 6 | 93 | 93.1 |
| Example 7 | 95 | 92.9 |
| Example 8 | 98 | 98.2 |
| Example 9 | 97 | 97.9 |
| Comparative Example 1 | 75 | 82.4 |
| Comparative Example 2 | 77 | 86.1 |
| Comparative Example 3 | 87 | 80.9 |
| Comparative Example 4 | 86 | 83.6 |
| Comparative Example 5 | 83 | 86.7 |

TABLE 2-continued

| Classification | Specific surface area compared to that of fresh catalyst (%) | DBT conversion rate compared to that of fresh catalyst (%) |
|---|---|---|
| Comparative Example 6 | 73 | 84.0 |
| Comparative Example 7 | 86 | 89.2 |

As shown in Table 2, the regenerated catalysts of Examples 1 to 9, remanufactured according to the present disclosure, exhibited a specific surface area of 93% or higher and a desulfurization performance of 92% or higher, compared to those of the fresh catalyst. In particular, the regenerated catalysts of Examples 1 to 3, 8, and 9 exhibited a specific surface area of 978 or higher and a desulfurization performance of 978 or higher, compared to those of the fresh catalyst. On the contrary, in the case of the regenerated catalysts remanufactured in Comparative Examples 1 to 7, specific surface area and desulfurization performance values that were lower than those of the fresh catalyst were exhibited.

As a result, it was found that a regenerated catalyst having a specific surface area and a desulfurization performance restored to levels equivalent to those of a fresh catalyst was able to be manufactured by the remanufacturing method of the present disclosure and was available as a substitute for the fresh catalyst.

Although the preferred embodiments of the present disclosure have been disclosed for illustrative purposes, the present disclosure is not limited thereby, and those skilled in the art will appreciate that various modifications, additions, and substitutions are possible, without departing from the scope and spirit of the present disclosure as disclosed in the accompanying claims.

What is claimed is:

1. A method of remanufacturing a spent catalyst for heavy oil desulfurization, the method comprising:

(a) performing heat treatment on a spent catalyst for heavy oil desulfurization;

(b) performing dry mixing by adding a spinel-structured metal oxide represented by Formula 1, a solid polycarboxylic acid, and a catalytically active material precursor to the spent catalyst obtained through the heat treatment; and (c) performing calcination of the resulting mixture obtained by the dry mixing, $$XAl_2O_4 \qquad \text{[Formula 1]}$$

wherein in Formula 1, X is Ni, Cu, or Zn.

2. The method of claim 1, wherein in the (a) performing, the heat treatment is performed at a temperature in a range of 250° C. to 350° C.

3. The method of claim 1, wherein in the (b) performing, the spinel-structured metal oxide represented by Formula 1 and/or the solid polycarboxylic acid is added to perform a first dry mixing, and then the catalytically active material precursor is added to perform a second dry mixing.

4. The method of claim 1, wherein in the (b) performing, 0.1 to 5 parts by weight of the spinel-structured metal oxide represented by Formula 1, 0.5 to 15 parts by weight of the solid polycarboxylic acid, and 0.5 to 15 parts by weight of the catalytically active material precursor are added, with respect to 100 parts by weight of the spent catalyst obtained through the heat treatment.

5. The method of claim 1, wherein in the (b) performing, the dry mixing is performed by mechanical mixing.

6. The method of claim 5, wherein the mechanical mixing is performed by milling at a rotation speed in a range of 100 rpm to 300 rpm in an inert atmosphere.

7. The method of claim 1, wherein the solid polycarboxylic acid is at least one selected from the group consisting of malonic acid, succinic acid, glutaric acid, adipic acid, pimelic acid, terephthalic acid, isophthalic acid, homophthalic acid, and phenyl glutaric acid.

8. The method of claim 1, wherein the catalytically active material precursor comprises at least one selected from the group consisting of: at least one metal selected from the group consisting of molybdenum, tungsten, cobalt, and nickel, oxides of the at least one metal selected from the group, and mixtures of both.

9. The method of claim 1, wherein in the (c) performing, the calcination is performed at a temperature in a range of 450° C. to 600° C.

10. The method of claim 1, wherein a regenerated catalyst remanufactured thereby has a desulfurization performance of 97% or higher with respect to that of a fresh catalyst.

11. The method of claim 1, wherein a regenerated catalyst remanufactured thereby has a specific surface area of 97% or higher with respect to that of a fresh catalyst.

* * * * *